July 13, 1937.  S. M. NAMPA  2,087,067
CAR LOADING DEVICE
Filed Nov. 23, 1934
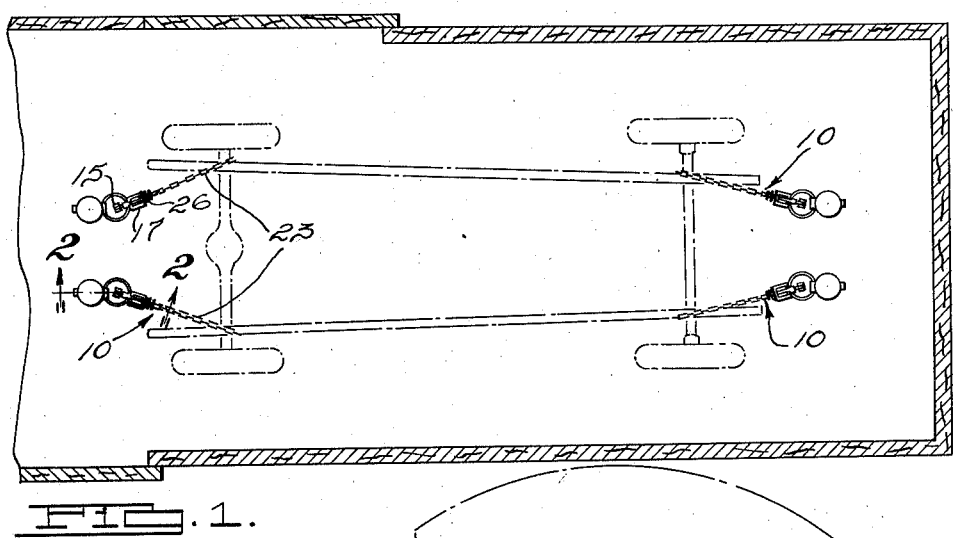
FIG. 1.
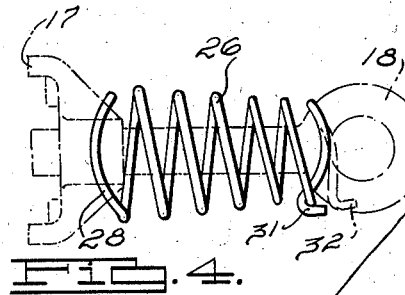
FIG. 4.
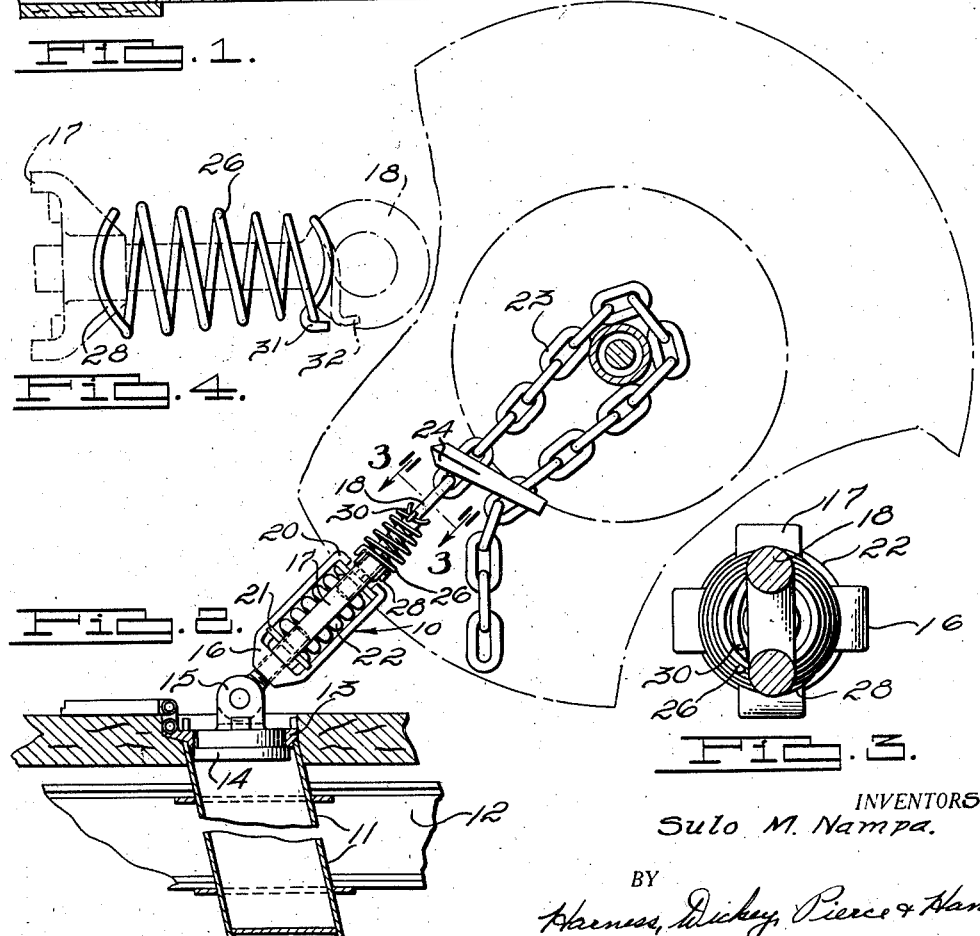
FIG. 2.
FIG. 3.
INVENTOR.
Sulo M. Nampa.
BY
Harness, Dickey, Pierce & Hann.
ATTORNEYS.

Patented July 13, 1937

2,087,067

UNITED STATES PATENT OFFICE 2,087,067

CAR LOADING DEVICE

Sulo M. Nampa, Detroit, Mich., assignor to The Worth Company, a corporation of Michigan Application November 23, 1934, Serial No. 754,399

3 Claims. (Cl. 287—62)

The invention relates particularly to carloading devices employed for anchoring automobiles in freight cars for transportation purposes.

In anchoring automobiles in freight cars at the present time chains and turn buckles are used for holding the automobile in position either on the floor of the freight car or on a frame for holding automobiles in semi-decking positions. The turn buckles provide a means of adjusting and tightening the chains and includes bolts having oppositely disposed threads and which are connected respectively to the chain and to the freight car or semi-decking frame as the case may be. It has been found, however, that in transporting the automobile, jolting of the freight car has a tendency to loosen the turn buckle and once loosening is initiated it seems that it rapidly loosens to such extent that the automobile becomes loosely anchored and this condition manifestly is undesirable.

One object of the present invention is to provide a means for preventing any loosening of the turn buckle during transportation of the automobile while still allowing manual adjustment and tightening of the turn buckle without difficulty.

Another object of the invention is to provide a means of this character which can be employed in conjunction with car-loading devices already installed in freight cars without requiring any disassembly of the turn buckle.

Other objects of the invention will become apparent from the following description, the drawing relating thereto, and from the claims hereinafter set forth.

For a better understanding of the invention reference may be had to the drawing illustrating one form of the invention, wherein:

Figure 1 is a plan view of a freight car illustrating one mode of anchoring an automobile on the floor of the freight car wherein chain devices are employed which include adjustable turn buckles.

Fig. 2 is a cross sectional view on a larger scale illustrating one of the chain devices in detail which is equipped with a spring for preventing loosening of the turn buckle.

Fig. 3 is a cross sectional view on a larger scale taken substantially along the lines 3—3 of Fig. 2.

Fig. 4 is a detail view illustrating the spring employed for preventing loosening of the turn buckle.

According to Fig. 1, the manner of anchoring an automobile on the floor of the freight car includes the use of four chain anchoring devices indicated at 10 which are connected to the ends of the axles of the automobile and to the floor of the freight car. These devices are so arranged as to prevent longitudinal as well as lateral movement of the automobile. As more particularly shown by Fig. 2 each of the anchoring devices includes a tube 11 connected to a beam 12 disposed under the floor of the freight car and which forms a part of the freight car frame, and at the upper end of the tube a ring 13 secured to the tube serves to anchor a head or piston 14. The head 14 is pivotally connected to an eye-bolt 15 which is threaded into the base portion of a turn buckle member 16 and a turn buckle member 17 similar to the member 16 is arranged in 90 degree turned relation to the latter. A second eye-bolt 18 is threaded into the base portion of the second member and each of the members 16 and 17 is provided with lips at their open ends which engage end plates 21 that in turn engage opposite ends of a spring 22. These plates have notches for receiving the legs of both members so that the latter are locked against relative turning. The eye-bolt 18 is connected to a chain 23 that is adapted to be looped around the axle of the vehicle and after the axle is so engaged by the chain, a grab-hook 24 may be employed for holding the chain portions connected.

The threads on the eye-bolts 15 and 18 are arranged oppositely and by turning the members 16 and 17 the chain device may be so adjusted that the automobile may be anchored properly. Owing particularly to the fact that the threads are disposed oppositely on the eye-bolts, loosening of the turn buckle increases more rapidly once loosening is initiated such as by jolting of the freight car during transportation. Thus it is important to prevent initial loosening of the turn buckle and at the same time it is important that any means provided for preventing loosening should not render it difficult to turn the turn buckle manually.

For accomplishing this result, a coiled spring 26 is provided and as best shown by Fig. 4 this spring has a longitudinal taper which increases its axial stability and prevents buckling when the spring is compressed. The coil at the larger end of the spring as shown by Figs. 2 and 4 is bent inwardly at opposite sides as indicated at 28 so as to provide a U shape end which overlaps the side portions of the base of the member 17 and it will be appreciated that with the spring under compression, this cooperation between the bent over end portions of the coil and the base of the member 17 will normally prevent relative turning of the member and the spring. The opposite and smaller end of the spring, as shown by Fig. 4, has its end coil dished as indicated at 30 so as to provide a seat for the eye portion of the bolt and the extreme end of the coil is of hook shape as indicated at 31, and engages under the next coil of the spring. It will be understood that the spring and eye bolt cannot turn relatively without causing the eye portion of the bolt to ride over the higher sides of the end coil 30 and since such movement of the eye portion of the bolt would require compression of the spring, normally the bolt and spring will not turn relatively. Since the member 17 cannot turn normally with respect to the spring, it follows that the member and eye bolt 18 normally will not turn relatively. Turning of the members 16 and 17 together in adjusting the turn buckle can be accomplished without great manual effort as the members and spring can be turned relative to the eye-bolt by causing the coil 30 to ride over the eye portion of the bolt until the latter again seats in the lower sides of the coil. It may be added that the hook 31 prevents the eye 18 on the bolt from positively catching the end of the coil and causing the latter to unwind.

The spring is so constructed that it can be installed in assemblies already in use without disassembling of the turn buckle or chain device and this is accomplished by initially having the end portion of the coil 30 open as indicated at 32 in Fig. 4 to provide an entry opening. This entry opening permits movement of the shank of the eye-bolt 18 thereinto and then by turning the spring the latter can be wound on the eye-bolt until all coils of the spring encircle the bolt. After this is accomplished, the end portion 31 of the spring can be moved to its closed position and the hook 32 engaged with the second coil by slight springing of the end of the end coil.

The invention provides a simple means for locking the turn buckle against loosening while still permitting adjusting and tightening thereof. Furthermore, it provides a simple means which can be inserted in devices already installed without requiring any disassembly of the parts. It also may be mentioned that the spring prevents injury to the threads on the eye-bolt which has sometimes occurred owing to loose movement of the end of the chain and engagement thereof with the threads of the bolt during jolting of the freight car.

Although only one form of the invention has been illustrated and described in detail, it will be apparent to those skilled in the art that various modifications may be made without departing from the scope of the appended claims.

I claim:

1. In a car loading device or the like, an eye bolt, a member threaded on the bolt, a spring on the bolt and having an end coil provided with dished portions for seating the eye portion of the bolt, and means normally locking the other end of the spring to the member against relative turning.

2. In a car loading device or the like, an eye bolt, a member threaded on the bolt, a spring on the bolt and having an end coil provided with dished portions for seating the eye portion of the bolt, and means normally locking the other end of the spring to the member against relative turning, and comprising a bent over portion of the end coil engaging the side wall of the member.

3. An article of manufacture for use in a car loading device, comprising a coiled spring, one end coil of the spring being bent at opposite sides so as to provide a U shape end, the extreme end of such end coil being of hook shape and being hooked under the inner side of an adjacent coil.

SULO M. NAMPA.